Sept. 26, 1961 W. S. TSUCHIYA 3,001,590
UNIT CARRIERS
Filed Jan. 13, 1958 3 Sheets-Sheet 2
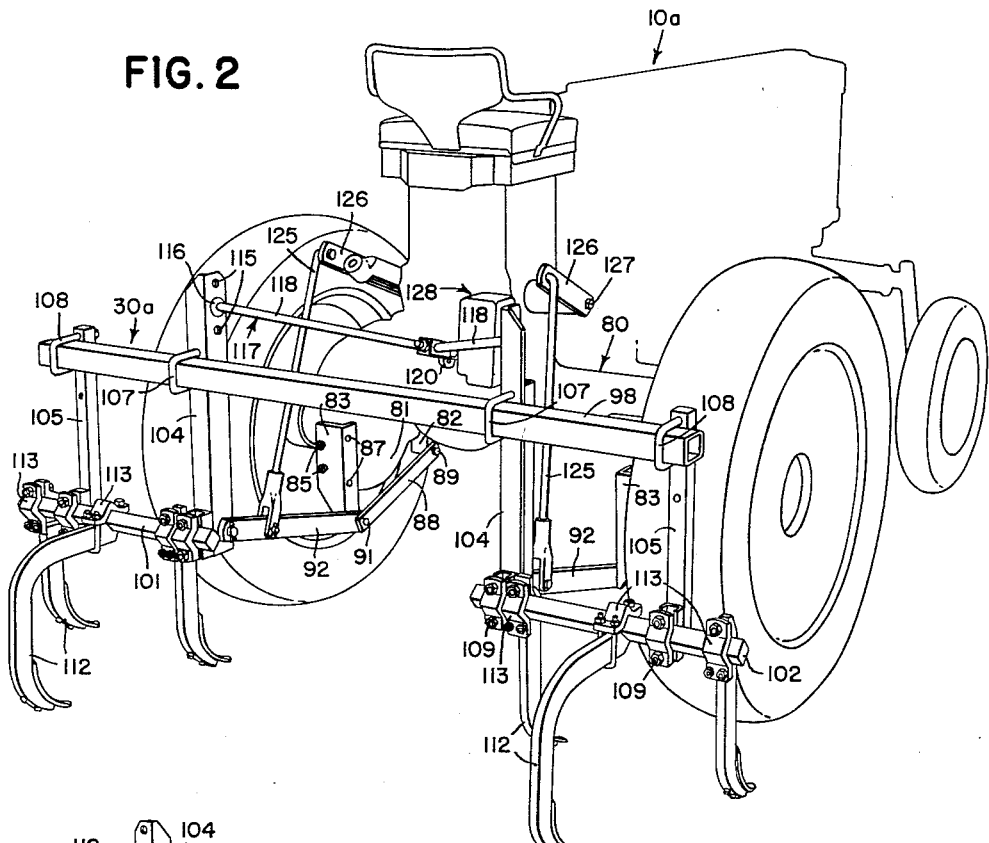
FIG. 2
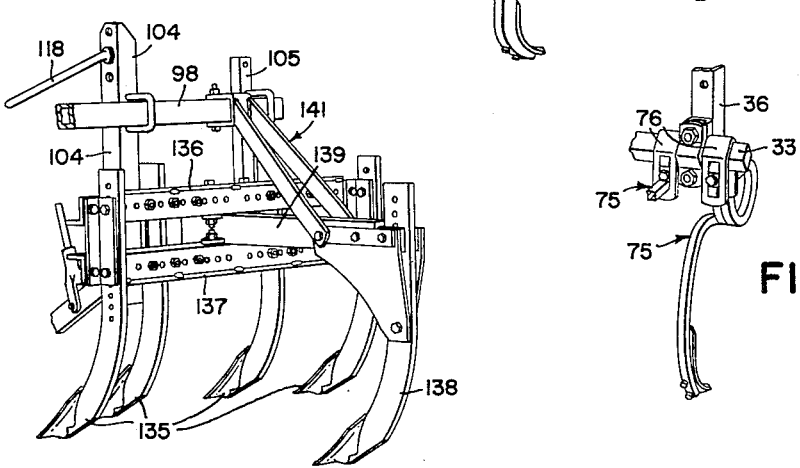
FIG. 4
FIG. 3
INVENTOR.
WILLIAM S. TSUCHIYA
BY
ATTORNEYS Sept. 26, 1961  W. S. TSUCHIYA  3,001,590
UNIT CARRIERS
Filed Jan. 13, 1958  3 Sheets-Sheet 3
FIG. 6
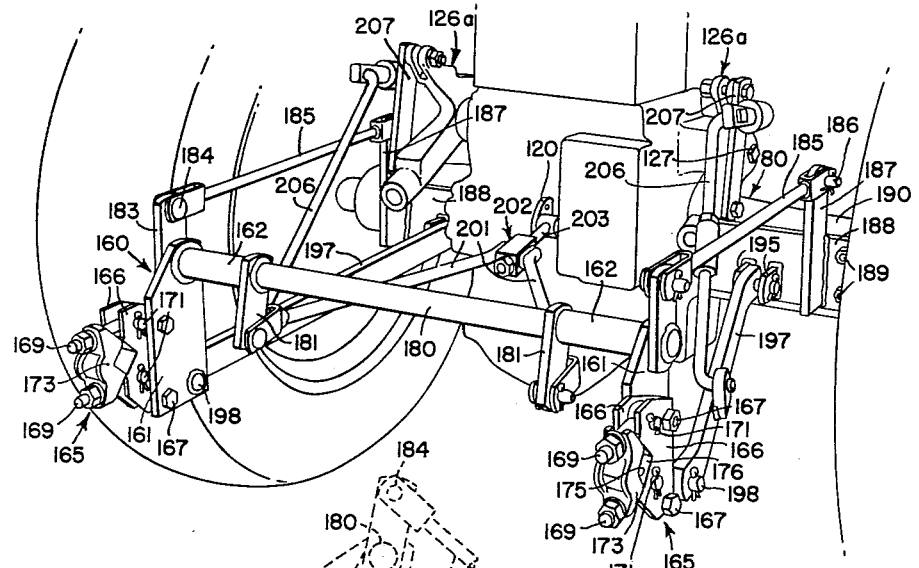
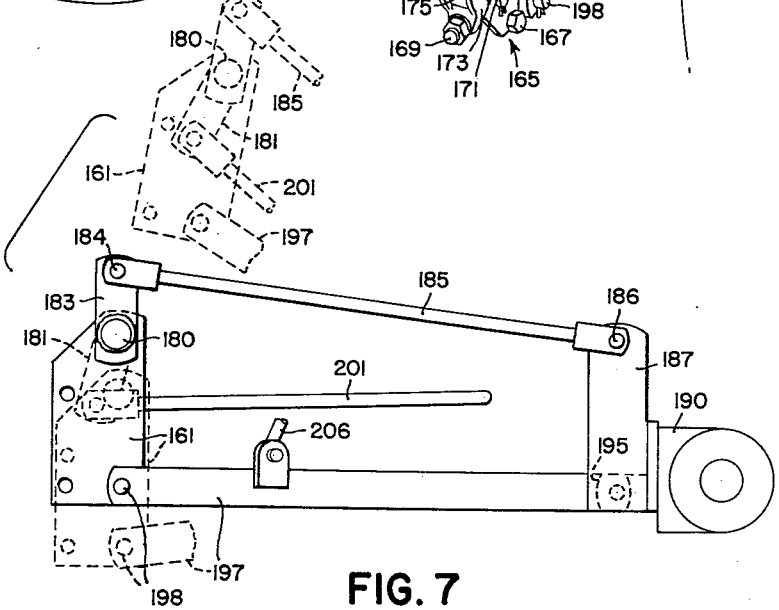
FIG. 7
INVENTOR.
WILLIAM S. TSUCHIYA
ATTORNEYS United States Patent Office 3,001,590
Patented Sept. 26, 1961

3,001,590
UNIT CARRIERS
William S. Tsuchiya, Los Angeles, Calif., assignor, by mesne assignments, to Deere & Company, a corporation of Delaware
Filed Jan. 13, 1958, Ser. No. 708,444
2 Claims. (Cl. 172—451)

The present invention relates generally to agricultural implements and more particularly implements adapted to be mounted on and carried by a farm tractor of the type having power lift means and what is commonly referred to as three-point hitch means.

The object and general nature of the present invention is the provision of a new and improved tool carrier adapted to be mounted on a tractor of the above-mentioned type so as to be raised and lowered, and/or otherwise controlled by the power lift mechanism of the tractor. Further, it is the feature of this invention to provide a tool carrier of sturdy and rigid construction and adapted to receive soil working or ground engaging tools of various kinds, such as coil spring cultivators, fixed tooth cultivators, disks, furrow openers, sugar cane equipment, and other attachments commonly used in agricultural practice.

More particularly, it is a feature of this invention to provide a tool carrier to receive various tools, attachments and the like, and especially adapted for use with tractors having exceptionally high clearance so as to enable the outfit to be used with crops that have attained a considerable height of growth.

These and other objects and advantages of the present invention will be apparent to those skilled in the art after a consideration of the following detailed description of the preferred structure in which the principles of the present invention have been incorporated, taken in conjunction with the accompanying drawings, in which:

FIG. 2 is a rear perspective view of a modified form of the present invention adapted for use with a somewhat larger tractor than the one shown in FIG. 1.

FIGS. 3 and 4 are fragmentary perspective views of two of the several other tools that may be connected to the carrier of this invention.

FIG. 5 is a fragmentary view showing the use of a long lower tool bar where high clearance is not required.

FIG. 6 is a rear perspective view of a modified form of carrier.

FIG. 7 is a side view of the carrier shown in FIG. 6.

Figure 1:
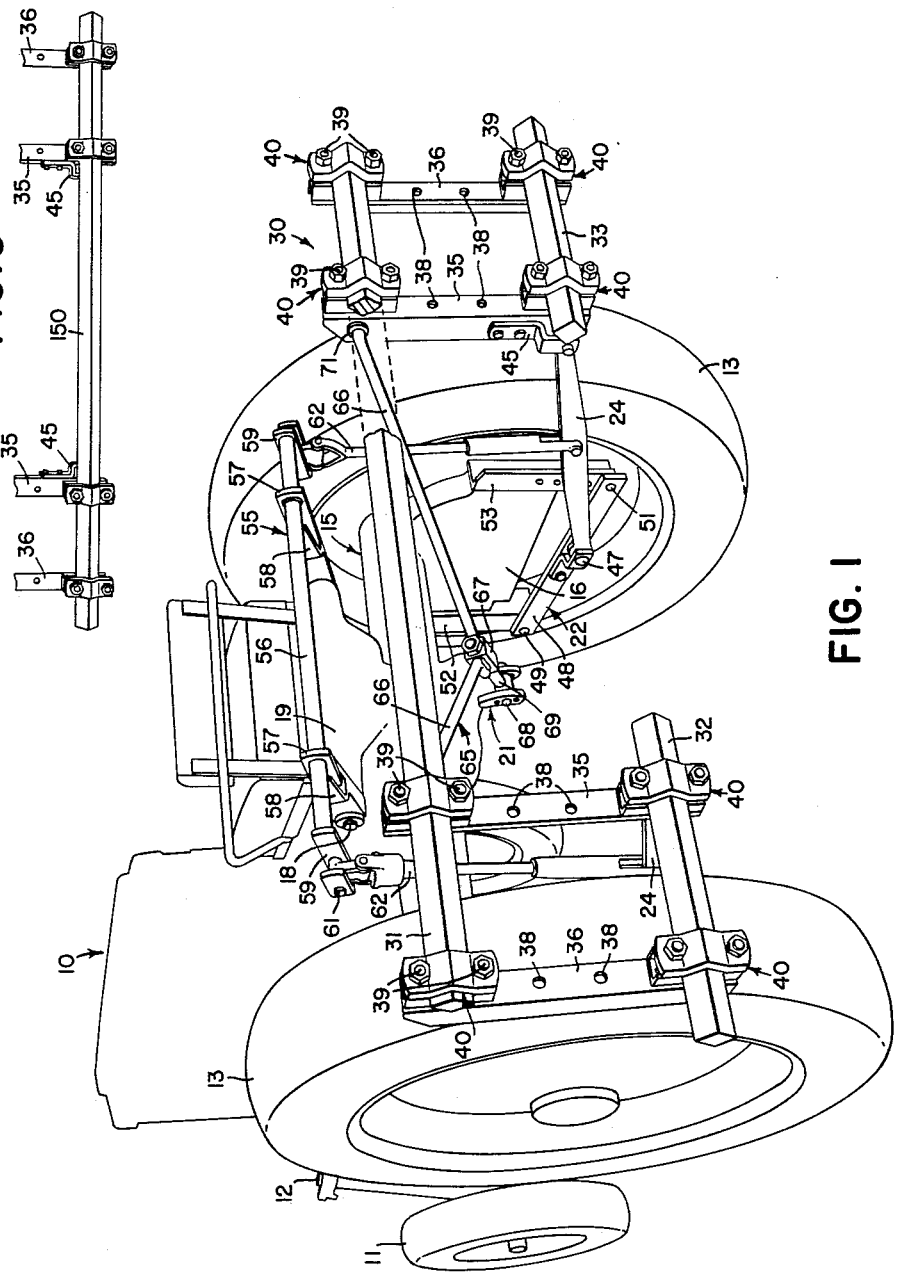
FIG. 1 is a rear perspective view of a tool carrier and its supporting tractor, in which the principles of the present invention have been incorporated.

Referring first to FIG. 1, the tractor is indicated in its entirety by the reference numeral 10 and, as illustrated, is of the high crop type. The tractor 10 includes the usual front wheels 11 provided with vertically extended spindles 12, and rear drive wheels 13 journaled for rotation on rear axle shafts carried by a rear axle 15 of the drop axle type. A drop axle is one in which the ends are formed with depending housing sections 16 securely connected at their upper portions with the usual transverse rear axle housing structure, providing thereby an arrangement in which the clearance between the central portion of the axle housing and the ground is considerable. A tractor of this type is especially adapted for use in tall, bushy or bedded crops. The tractor 10 is provided with a power lift mechanism that, so far as the present invention is concerned, is generally conventional, embodying a transverse power actuated rockshaft 18 journaled in a power lift housing 19. The tractor 10 is also so constructed and arranged as to provide means, indicated at 21, to receive the upper link of a three link attaching system or hitch system and laterally spaced apart means 22 to receive the forward ends of a pair of draft links 24.

The tool carrier of the present invention is indicated in its entirety by the reference numeral 30 and includes a transverse rigid tool bar 31 that extends from one side of the tractor to the other and a pair of lower relatively short tool bars 32 and 33 that are disposed below the upper bar 31 and with a considerable space therebetween in a generally vertical direction. Also, the lower tool bars 32 and 33 are spaced apart in an axial direction to provide the desired crop clearance laterally of the tractor. Each of the lower tool bars 32 and 33 is rigidly connected to the adjacent end portions of the upper transverse tool bar 31 by a pair of vertical members 35 and 36, each preferably being in the form of an angle and provided with a plurality of apertures, as indicated at 38. The upper end of each of the angles 35 and 36 is apertured to receive bolts 39 that effectively secure clamp means 40 to the rear faces of said angles, the clamp means 40 serving to securely and rigidly fasten the upper ends of the vertical bars 35 and 36 to the adjacent end portions of the upper transverse tool bar 31.

Similar clamps and associated clamping bolts are provided to securely fix the lower tool bars 32 and 33 to the lower ends of the vertical bars 35 and 36, and hence the same reference numerals have been used for the lower clamps.

As will be seen from FIG. 1, when the upper and lower bars 31, 32 and 33 are connected together in rigid fashion by the clamps 40, the bars form a vertically and laterally rigid tool carrier to which any one of a variety of types of ground working or ground engaging tools may be connected. For example, as shown in FIG. 3, each of the lower bars 32 and 33 may carry a plurality of coil spring standards of the general type shown in U.S. Patent 2,584,614 issued February 5, 1952, to Rasmussen et al. Tools of this type are generally fixed directly to the lower tool bars 32 and 33, in which case the upper transverse tool bar 31 serves primarily as means to add rigidity to the outfit so that all tools are correctly and positively held in the proper position by the tractor power lift mechanism. Other tools, as will be referred to below, may be connected not only to the lower tool bars 32 and 33 but also to the upper transverse bar 31.

The laterally inner vertical bars 35 are each provided with a hammer strap 45 that is apertured so as to receive suitable pivot means 46 by which the rear end of the associated draft link 24 may be swingably connected with the associated tool bar, 32 or 33, through the lower end of the associated vertical bar 35 to which the hammer strap 45 is directly connected. The forward end of each of the laterally spaced apart draft links 24 is swingably connected, as at 47, with a lower link attaching bar 48 that is disposed closely adjacent the face of the associated draft axle housing 16, being pivotally connected to the latter, as at 49, and held in the selected position relative thereto by bolt means 51. The bar 48 is fixed to the associated drop housing 16 by means including bracket angles 52 and 53. The left hand draft link 24 is similarly connected to the associated draft axle housing, and these parts, there being a set at each side of the tractor, form the laterally spaced apart means 22 mentioned above. From FIG. 1 it will be seen that this particular construction provides the desired crop clearance. In the particular tractor and implement combination shown in FIG. 1 there is a clearance of almost four feet laterally and almost three feet vertically for plants passing under the tractor. There is a similar clearance between the inner ends of the tool bars 32 and 33.

In order to accommodate this extra wide spacing between the draft links 24, the carrier means of the present invention also include an auxiliary lift assembly indicated in its entirety by the reference numeral 55. This assembly will now be described.

The lift arm assembly 55 comprises a transverse lift shaft 56 having inner arm sections 57 adapted to be bolted or otherwise secured to the lift arms 58 that form a part of the tractor power lift means, particularly the rockshaft 18. The transverse lift shaft 56 extends laterally outwardly beyond the ends of the tractor rockshaft 18 and carry outer lift arm sections 59 that are apertured to receive lift pins 61 by which the upper ends of lift links 62, which normally may be a part of the tractor system, are connected thereto. The lower ends of the lift links 62 are swingably connected with the draft links 24, which also may normally be a part of the tractor system. By virtue of the construction just described, whenever the tractor power lift means is actuated to rock the lift rockshaft 18, the rockshaft assembly 55 is raised and lowered, and this acts through the lift links 62 to raise and lower the draft links 24, thus raising and lowering the tool carrier itself.

The upper portion of the tool carrier is connected with the link receiving means 21 on the upper central portion of the tractor by a thrust or compression link 65. This member preferably is in the form of a yoke having rearwardly diverging sections 66 and a forward central section 67 that is adapted to be pivotally connected, as at 68, to the link receiving means 21. As shown in FIG. 1, this part is in the nature of a load controlling yoke which is connected into the tractor hydraulic system so as to automatically respond to the amount of thrust transmitted thereto by the upper link means 65 for automatically operating the power lift rockshaft 18 to raise and lower the tool carrier and any tools connected thereto. The forward central part 67 of the upper link means 65 includes an adjustable part 69, which may be in the form of a load control screw the head of which pivotally receives the pin 68.

In operation, the tool carrier is held against or limited in its lateral movement relative to the tractor by virtue of the stabilizing action of the upper link means 65 which, being in the form of a yoke or fork, is laterally rigid. The rear ends of the upper link sections 66 are pivotally connected, as at 71, in openings in the forwardly extending flanges of the laterally inner rigid vertical bars 35. Also, the lower draft links 24 are limited in their lateral swinging by virtue of their contact with the brackets 53 on the drop housing sections of the tractor rear axle.

In FIG. 3 I show one of several different kinds of tools that are adapted to be mounted on the carrier 30. The tool shown in FIG. 3 is in the nature of a coil spring tooth or standard 75 fixed to the lower bar 33 by suitable clamp means 76. As many tools 75 may be connected to the lower bars 32 and 33 as may be desired. It will be noted that the tool bars 32 and 33 are mounted directly behind the rear wheels 13 of the tractor, and hence the tools 75 obliterate the tracks formed by the tractor rear wheels, thus loosening the ground after passage of the rear wheels and preventing undesirable compaction of the soil.

FIG. 2 shows a modified form of the present invention in which a tool carrier 30a is applied to a tractor somewhat larger than the tractor shown in FIG. 1 although of about the same construction. In FIG. 2 the tractor 10a is provided with a rear axle structure 80, also of the drop axle type, having drop axle sections in the form of final drive housings 81 arranged in depending relation. Front and rear drawbar supports 82 and 83 are fixed to the drop axle sections 81, each of the drawbar supports 82 and 83 being in the form of a vertical angle member secured, as at 85, to the front and rear portions of the drop axle housing sections 81. The lower ends of the front drawbar support angles 82 are apertured to receive the tractor drawbar (not shown, but of conventional construction so far as the present invention is concerned), the drawbar being pivoted so as to be capable of swinging vertically, and the tractor drawbar may be secured to the rear drawbar support angles 83 in one of several different positions, as determined by a plurality of openings 87 in the vertical fore-and-aft extending flanges of the angles 83. According to the present invention the tractor drawbar is removed and in lieu thereof a fore-and-aft extending brace bar 88 is connected to the lower end of each front drawbar support angle 82, as indicated at 89. The rear end of each brace bar 88 is connected to the lower end of the associated rear drawbar support angle 83 by means 91 that is so constructed and arranged as to provide for pivotally receeiving the forward end of the associated lower draft link 92.

The tool carrier 30a is itself substantially identical with the tool carrier 30 described above. The tool carrier 30a includes an upper transverse bar 98, preferably in the form of a tube that is square in cross section, and a pair of laterally spaced apart transversely aligned lower tool bars 101 and 102 that, like the lower bars 32 and 33 described above, are square in cross section. Each of the lower bars 101 and 102 is connected with the adjacent end portion of the upper bar 98 by a pair of vertical rigid bars 104 and 105, each vertical bar 104 being in the nature of an angle member apertured to receive a U bolt 107 that securely clamps the upper transverse bar 98 to the associated vertical bars 104. Similar U bolts 108 clamp the outer end portions of the transverse bar 98 to the upper ends of the outer vertical bars 105, which are square in section but solid. The lower ends of each of the vertical bars 104 and 105 carry suitable clamp means 109 by which the associated lower bars 101 and 102 are rigidly connected to the lower portions of the vertical bars 104 and 105. The transverse lower bars 101 and 102 are adapted to receive associated tools of any desired or suitable type or construction. As shown in FIG. 2, the tools 112 are in the form of points or shovels secured rigidly to the transverse tool receiving bars 101 and 102 by clamps 113.

In the form of the invention shown in FIG. 2, the laterally inner vertical bars 104 extend upwardly beyond the transverse upper bar 98 and the laterally inner flanges of the angle members 104 are apertured, as at 115, to selectively receive the rear ends 116 of an upper link means 117. The latter, like the upper link means 65 of FIG. 1, is in the nature of a fork or yoke, of which the ends 116 are parts of rearwardly diverging sections 118. The forward end of the upper link means 117 of FIG. 2 is constructed like the link means 65 of FIG. 1, and is connected into the load and/or draft responsive link-receiving means 120 of the tractor 10a. The rear ends of the link sections 118 may be disposed in selected openings 115, according to the tools employed and the draft or load reactions thereof.

Each of the lower draft links 92 is connected through a lift link 125 with the associated lift arm 126, the lift arm 126 being rigidly secured to the transverse rockshaft of the tractor 10a, the rockshaft being indicated at 127 and forming a part of the power lift means 128 of the tractor 10a.

FIG. 4 shows a plurality of cane chisels 135 fixed to the end and intermediate portions of upper and lower adjustable bars 136 and 137 and a rear centrally disposed chisel 138 fixed to a beam 139 that is connected in any suitable way at its forward end to the cross bars 136 and 137. The latter are bolted to the vertical bars 104 and 105, and the beam 139 is reenforced by a U-shaped brace 141 connected between the rear portion of the beam 139 and the adjacent end portion of the upper transverse bar 98. Thus, both main transverse bar 98 and the lower spaced apart bars 101 and 102 are adapted, under certain conditions, to receive tool means, whereby the upper bar 98 serves not only to hold the tool supporting means rigid but also to receive directly associated tool means. If desired, the chisels 135 and 138 may be replaced by cane plows for breaking out old beds or making rows, or bedding and cane chopper disks may be connected to the bars 136 and 137.

FIG. 5 illustrates the substitution of a long tool bar for the relatively short spaced apart tool bar sections 32 and 33. In FIG. 5 the long tool bar is indicated by the reference numeral 150 and can readily be used as a regular carrier, adapted to receive such tools as coil-spring standards, stiff standards, disk ridgers, listers, and other tool units, when high crop clearance is not required.

A further modified version of the present invention is shown in FIGS. 6 and 7. Referring first to FIG. 6, the tool carrier shown includes a carrier frame 160 that includes a pair of laterally spaced apart generally vertical arms 161, each apertured at its upper end and around the aperture is fixed a laterally inwardly extending sleeve 162, the outer end of the latter being fixed as by welding to the upper end of the associated arm 161. Fixed to the lower end of each of the arms 161 is a tool bar receiving clamp 165 each of which comprises a pair of spaced apart clamp plates 166 fixed, as by bolts 167, to the associated arm 161. A pair of eye bolts 169 have their forward eye ends disposed between the plates 166 and swingably connected therewith by pins 171. Mounted on each pair of bolts 169 is a clamp cap 173 that is notched, as at 175, to receive a tool bar, such as the one shown in FIG. 5 at 150 or some other tool bar section. The clamp plates 166 are also notched and receive a V plate 176 welded thereto, the plate 176 having the same angularity as the notch 175 of the cap 173.

Rockably disposed within the bushings or sleeves 162 is a rockshaft 180 to which is welded a pair of load control arms 181, the arms being spaced so as to lie closely adjacent the inner ends of the sleeve 162. The outer ends of the rockshaft 180 extend outwardly beyond the lower link arms 161 and have welded or otherwise securely fixed thereto a pair of upwardly extending arms 183. The upper ends of the arms 183 are apertured to receive pivots 184 that connect compression link members 185 to the upwardly extending arms 183. The forward ends of the compression link members 185 are pivotally connected, as at 186, to uprights 187 that are fixed to attaching plates 188 apertured to receive attaching studs 189 that are carried by the laterally outwardly extending rear axle housing sections 190, which form a part of the tractor rear axle 80. Also secured to the attaching plates 188 are pairs of attaching lugs 195, each pair carrying a pivot to which the forward end of the associated lower draft link 197 is swingably connected. The rear end of each of the links 197 is swingably connected to the lower end of the associated arm 161 by means of a laterally outwardly extending stud 198. The lower ends of the rockshaft arms 181 are pivotally connected with the forwardly converging bars 201 that form a load control fork indicated in its entirety by the reference numeral 202, the latter being adjustably connected, as by an adjusting rod 203, with the load response means 120 of the tractor. Lift links 206 are pivotally connected with and extend generally vertically from the draft links 197 and are connected by means of a pair of power lift attaching plates 207 that are removably connected with the power lift arms 126a of the tractor. The lift arms 126a shown in FIG. 6 are a modified form of the lift arms 126 shown in FIG. 2.

In the form of the invention shown in FIG. 6, the draft links 197 are connected to the tractor at a relatively high point, namely, at the rear axle housing 80. In order to prevent the imposition of excessive loads on the tractor load control or load response system, represented by the connection 120, the rockshaft 180 and associated parts are so constructed and arranged as to reduce, substantially by half, the load imposed on the tractor by the load control fork 202. This effect is secured in the following way. The ground working tools (not shown in FIG. 6) extend generally downwardly a substantial distance from the transverse tool bar that is seated in the tool bar clamps 165, and the effect of the soil pressure against the lower ends of such tools is to rock the carrier frame 160 about the transverse axis that is defined by the lower link pivots 198. The upper ends of the carrier arms 161 transmit this force to the transverse rockshaft 180. In effect, this reaction is divided between the upper compression links 185, which are fulcrumed at 186 on the upper ends of the fixed uprights 187, and the rearwardly diverging sections 201 of the load control fork 202. In this way, the tractor load control system is protected against overloads which might otherwise occur if the full reaction of the soil pressure in operation were transmitted directly to the load control connection 120.

Also, the load control fork 202 functions to prevent undesirable lateral displacement of the tool carrier in substantially the same manner as the action of the load control fork 117, FIG. 2, and the similar load control fork 65 shown in FIG. 1; further, in the form of the invention shown in FIGS. 6 and 7, the compression links 185, the rockshaft 180, and the load control fork 202 serve to prevent the tool from being displaced about a generally fore-and-aft extending axis, since if one end of the tool bar should tend to rise, relative to the other end, such action is prevented by the rockshaft 180, the arms 181 and 183, and the compression links 184, the rockshaft 180 being torsionally rigid.

Further, as will be seen particularly from FIG. 7, the angular relationship of the upper and lower links is such that, when the tractor power lift mechanism is operated to rock the power lift rockshaft 127, during approximately the first two-thirds of the range of movement the tool carrier 160 and associated tools move generally through parallel positions, but during the final one-third of the range of movement the tool carrier 160 experiences some rocking action about a generally transverse axis that results in imparting additional elevation to rearwardly extending tools, thus facilitating travel of the outfit in a transport position through depressions, swales and the like.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A tool carrier for a tractor of the three-point hitch type having an upper generally centrally disposed thrust-receiving means, a pair of lower draft-receiving means, and a power-actuated lifting rockshaft having a pair of arms fixed to the ends thereof, said lower draft-receiving means being spaced apart farther than the length of said lifting rockshaft whereby said lower draft-receiving means lie laterally outwardly of the ends of said rockshaft, said carrier comprising a rigid transverse frame extending laterally outwardly beyond said lower draft-receiving means and including generally transversely extending rigid bars, one disposed above the other and rigidly interconnected, a pair of draft links swingably connected at their rear ends with certain of said rigid bars and adapted to be connected at their forward ends with the tractor through said lower draft-receiving means, a rigid generally Y-shaped yoke arranged in rearwardly diverging relation and swingably connected at its laterally spaced apart portions with said upper transverse bar, the forward end of said Y-shaped yoke being connected with the tractor at said upper centrally disposed thrust-receiving means and a transverse auxiliary lift assembly releasably attachable to the tractor rockshaft and including a transverse shaft, inner arm sections fixed to said latter shaft and attachable, respectively, to said rockshaft arms, said transverse shaft extending laterally beyond said inner arm sections, and outer lift arm sections fixed to said transverse shaft and connectible with said draft links respectively.

2. A tool carrier for a tractor of the three-point hitch type having means to receive the forward ends of a pair of laterally spaced apart lower draft links, means above said draft link-receiving means to receive the rear end of an upper thrust-transmitting link means, and laterally spaced apart rear wheels, said carrier comprising an upper transverse bar disposed transversely of the tractor and extending laterally to points in rear of said rear wheels, two laterally spaced apart vertical members rigidly secured to each end portion of said transverse bar and extending downwardly therefrom in rear of said wheels, a relatively short transverse bar carried in rear of said rear wheels by the lower end portions of each pair of vertical members and located by the latter in rear of said rear wheels, a draft link swingably connected with the lower portion of each laterally inner vertical bar and adapted to be connected at its forward end with the tractor, upper thrust-transmitting link means swingably connected at its rear portion with said transverse bar and adapted to be connected at its forward end with the tractor, and ground-working means carried by said relatively short transverse bars.

References Cited in the file of this patent

UNITED STATES PATENTS

| | | |
|---|---|---|
| 2,364,121 | Arps | Dec. 5, 1944 |
| 2,462,726 | Currie | Feb. 22, 1949 |
| 2,515,637 | Dooley et al. | July 18, 1950 |
| 2,574,379 | Cummings | Nov. 6, 1951 |
| 2,607,276 | Morton | Aug. 19, 1952 |
| 2,608,327 | Bartling | Aug. 26, 1952 |
| 2,655,853 | Lee | Oct. 20, 1953 |
| 2,675,751 | Weber | Apr. 20, 1954 |
| 2,714,347 | Roessler | Aug. 2, 1955 |
| 2,755,722 | Fraga | July 24, 1956 |

FOREIGN PATENTS

| | | |
|---|---|---|
| 1,073,132 | France | Mar. 17, 1954 |